US012472372B2

(12) United States Patent
Kang et al.

(10) Patent No.: US 12,472,372 B2
(45) Date of Patent: Nov. 18, 2025

(54) WEARABLE DEVICE FOR MALE GENITALIA

(71) Applicant: DARAM Inc., Busan (KR)

(72) Inventors: Seok Hee Kang, Busan (KR); Hyangmi Park, Busan (KR)

(73) Assignee: DARAM Inc., Busan (KR)

(*) Notice: Subject to any disclaimer, the term of this patent is extended or adjusted under 35 U.S.C. 154(b) by 0 days.

(21) Appl. No.: 18/284,289

(22) PCT Filed: Oct. 11, 2022

(86) PCT No.: PCT/KR2022/015289
§ 371 (c)(1),
(2) Date: Sep. 27, 2023

(87) PCT Pub. No.: WO2024/075880
PCT Pub. Date: Apr. 11, 2024

(65) Prior Publication Data
US 2024/0269476 A1     Aug. 15, 2024

(30) Foreign Application Priority Data

Oct. 7, 2022 (KR) .................. 10-2022-0128303

(51) Int. Cl.
A61N 5/06     (2006.01)

(52) U.S. Cl.
CPC ........ *A61N 5/06* (2013.01); *A61N 2005/0645* (2013.01); *A61N 2005/0652* (2013.01); *A61N 2005/0653* (2013.01); *A61N 2005/0666* (2013.01)

(58) Field of Classification Search
CPC .............. A61N 5/06; A61N 2005/0645; A61N 2005/0652; A61N 2005/0653; A61N 2005/0666
See application file for complete search history.

(56) References Cited

U.S. PATENT DOCUMENTS 5,899,875 A * 5/1999 Millot ................. A61N 1/0448
604/20
6,241,752 B1 * 6/2001 Sheinman ............ A61N 5/0613
607/91

(Continued)

FOREIGN PATENT DOCUMENTS

CN     204106863 U     1/2015
CN     114948628 A     8/2022

(Continued)

OTHER PUBLICATIONS

Extended European Search Report in Application No. 22936710.7 dated Jun. 12, 2024, 8 pages.

*Primary Examiner* — Jennifer Pitrak McDonald
*Assistant Examiner* — Shreya Anjaria
(74) *Attorney, Agent, or Firm* — Park, Kim & Suh, LLC

(57) ABSTRACT

A wearable device for male genitalia in the inventive concept includes a body being in form of a half ring and being in contact with a penis and a scrotum, a hinge connected with the body to be adjustable in an angle to position the penis and the scrotum at an inner side of the body, and a light radiation device provided in the body to radiate light having a predetermined wavelength band in the direction of the penis and the scrotum.

11 Claims, 6 Drawing Sheets

(56) References Cited

U.S. PATENT DOCUMENTS

| | | | |
|---|---|---|---|
| 6,290,713 B1 * | 9/2001 | Russell | A61N 5/0616 |
| | | | 607/91 |
| 2001/0007080 A1 | 7/2001 | Sheinman et al. | |
| 2004/0129277 A1 | 7/2004 | Parkes | |
| 2005/0197682 A1 * | 9/2005 | Fox | A61N 5/0613 |
| | | | 607/88 |
| 2007/0233208 A1 * | 10/2007 | Kurtz | A61N 5/0613 |
| | | | 607/88 |
| 2014/0067024 A1 | 3/2014 | Jones et al. | |
| 2018/0228638 A1 * | 8/2018 | Spector | A61H 23/008 |
| 2022/0241606 A1 | 8/2022 | Yoo et al. | |

FOREIGN PATENT DOCUMENTS

| | | |
|---|---|---|
| JP | H10-509883 A | 9/1998 |
| KR | 20-0373065 Y1 | 1/2005 |
| KR | 10-2006-0127450 A | 12/2006 |
| KR | 10-2008-0012959 A | 2/2008 |
| KR | 10-0889296 B1 | 3/2009 |
| KR | 20-0466208 Y1 | 4/2013 |
| KR | 10-1955169 B1 | 3/2019 |
| KR | 10-2021-0000442 A | 1/2021 |
| WO | 01/14012 A1 | 3/2001 |
| WO | 2011/137471 A1 | 11/2011 |
| WO | WO-2020109636 A1 * | 6/2020 |
| WO | 2022/157136 A1 | 7/2022 |

* cited by examiner

WEARABLE DEVICE FOR MALE GENITALIA

CROSS-REFERENCE TO RELATED APPLICATIONS

This application is a National Phase Application of PCT International Application No. PCT/KR2022/015289, which was filed on Oct. 11, 2022, and which claims priority from Korean Patent Application No. 10-2022-0128303 filed on Oct. 7, 2022. The disclosures of the above patent applications are incorporated herein by reference in their entirety.

TECHNICAL FIELD

The inventive concept relates to a wearable device for male genitalia to improve a male reproductive function.

BACKGROUND ART

In general, as a male ages, testosterone levels decrease. Duo to this, male's hair becomes thinner or male's skin becomes less elastic, and male's muscle mass decreases and male's bone density levels decrease. Hyperlipidemia, diabetes, decreased sexual function, a sense of helplessness, a sense of fatigue, and the like may be felt.

Recently, various treatment methods for increasing male testosterone levels have been developed. However, it may be treated only by a doctor's prescription or in limited circumstances, and various side effects may occur.

Thus, there is a need for a technology for improving a male reproductive function to improve health.

DETAILED DESCRIPTION OF THE INVENTION

Technical Problem

The technical problem to be solved by the inventive concept is to provide a wearable device for male genitalia to be easy to carry.

The technical problem to be solved by the inventive concept is to provide a wearable device for male genitalia to radiate light with a specific wavelength band to the male genitalia to increase a male testosterone level and improve a male reproductive function.

Technical Solution

According to an exemplary embodiment, a wearable device for male genitalia may include a body being in form of a half ring and being in contact with a penis and a scrotum, a hinge connected with the body to be adjustable in angle and position the penis and the scrotum at an inner side of the body, and a light radiation device provided in the body to radiate light having a predetermined wavelength band in the direction of the penis and the scrotum.

Furthermore, the body according to an embodiment of the inventive concept may include a left body connected with one end of the hinge to be in contact with the penis and face a left scrotum and a right body connected with the other end of the hinge to be in contact with the penis and face a right scrotum.

Furthermore, the hinge according to an embodiment of the inventive concept may increase an angle between the left body and the right body when external forces are applied to the left and the right bodies in opposite directions and may decrease the angle between the left body and the right body when the external forces are applied to the left and the right bodies in the same directions.

Furthermore, the penis and the scrotum may be positioned at the inner side of the body when the angle between the left body and the right body increases by the external forces, and the penis and the scrotum may be fixed to the inner side of the body when the angle between the left body and the right body decreases by the external forces in the state where the penis and the scrotum are positioned at the inner side of the body.

Furthermore, the light radiation device according to an embodiment of the inventive concept may include a plurality of point light sources positioned at an upper side facing the penis and the scrotum in the left and right bodies to radiate the light having the predetermined wavelength band during a predetermined duration.

Furthermore, the light radiation device according to an embodiment of the inventive concept may include a surface light source positioned at an upper side facing the penis and the scrotum in the left and right bodies to radiate the light having the predetermined wavelength band during a predetermined duration.

Furthermore, the surface light source according to an embodiment of the inventive concept may be composed of any one of an organic light emitting diodes (OLED) element, a quantum dot light emitting diode (QLED) element, and an electroluminescence (EL) element.

Furthermore, the wearable device according to an embodiment of the inventive concept may further include a diffusion panel disposed on an upper surface of the left and right bodies facing the penis and the scrotum to diffuse the light radiated from the point light sources in the direction of the penis and the scrotum.

Furthermore, the left and right bodies according to an embodiment of the inventive concept may include a reflector panel positioned in the left and right bodies to reflect the light radiated from the point light sources in the direction of the penis and the scrotum.

Furthermore, the wearable device according to an embodiment of the inventive concept may further include a diffusion panel disposed on an upper surface of the left body and the right body facing the penis and the scrotum to diffuse the light reflected from the reflector panel in the direction of the penis and the scrotum.

Furthermore, the light radiation device according to an embodiment of the inventive concept may include a plurality of micro LED elements positioned at an upper side facing the penis and the scrotum in the left and right bodies to radiate the light having the predetermined wavelength band during a predetermined duration.

Advantageous Effects of the Invention

The wearable device for male genitalia according to the inventive concept may be simply carried by the user and may improve a male reproductive function.

Furthermore, the wearable device for male genitalia according to the inventive concept may increase a male testosterone level using light with a specific wavelength band and may improve a male reproductive function to improve health.

BEST MODE

Figure 1:
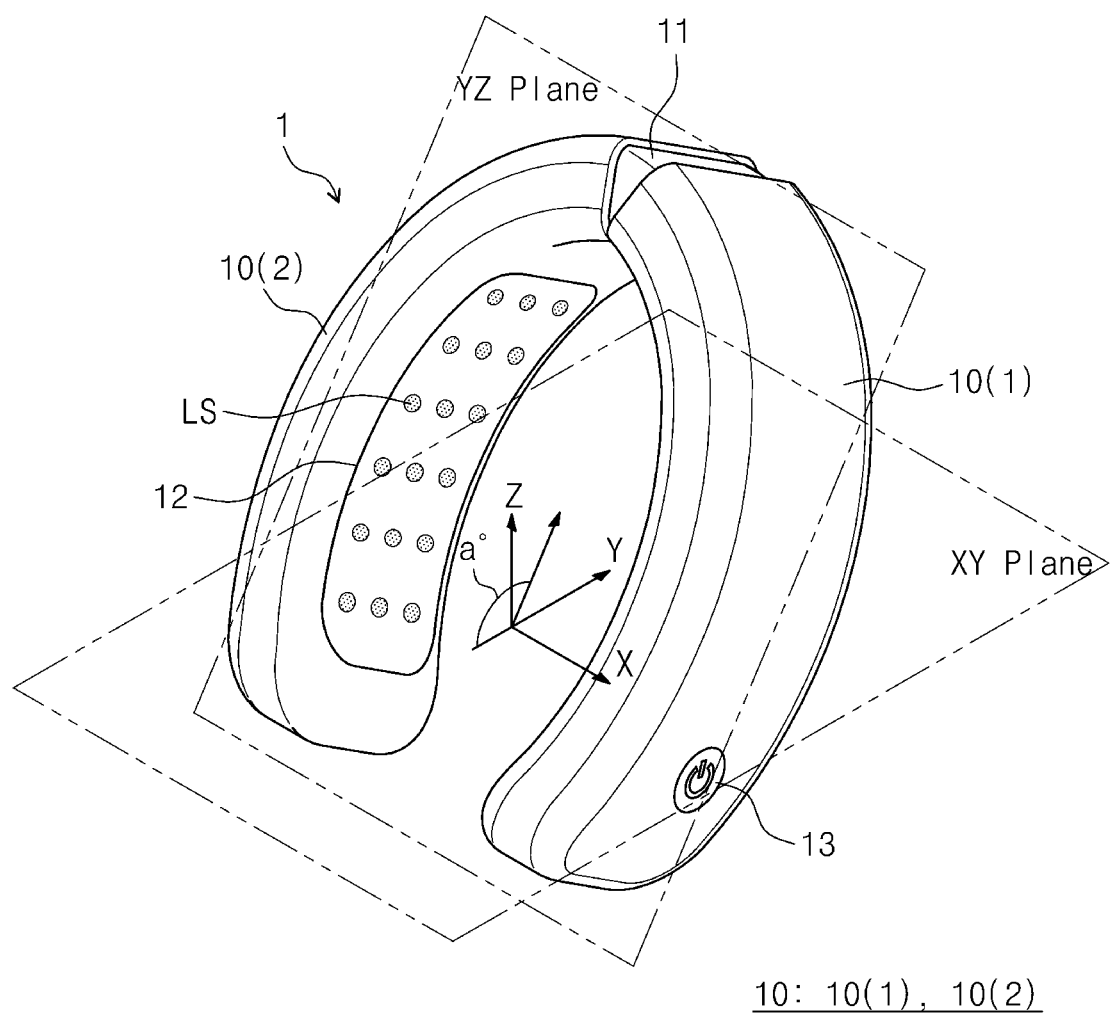
FIG. 1 is a perspective view of a wearable device for male genitalia according to an embodiment of the inventive concept.

Hereinafter, various embodiments of the inventive concept will be described more fully with reference to the accompanying drawings to such an extent as to be easily embodied by one skilled in the art, the inventive concept may be embodied in many different forms and should not be construed as limited to the embodiments set forth herein.

In drawings, components or elements not associated with the detailed description may be omitted to describe the inventive concept clearly, and like reference numerals refer to like elements throughout this application. Therefore, the reference numerals described above may be used in other drawings.

In addition, the size and thickness of each component shown in the drawings may be exaggerated for convenience of description. The inventive concept is not limited by the embodiments shown in the drawings. In the drawings, the thickness may be exaggerated in order to clearly express various layers and regions.

In addition, the expression "equal to or the same as" in the description may mean "substantially equal to or the same as". That is, it may be the same enough to convince those skilled in the art to be the same. Even other expressions may be expressions from which "substantially" is omitted.

FIG. 1 is a perspective view of a wearable device for male genitalia according to an embodiment of the inventive concept. FIG. 2 is a cross-sectional view of a wearable device for male genitalia in FIG. 1 according to an embodiment of the inventive concept.

Referring to FIG. 1, a wearable device 1 for male genitalia according to an embodiment of the inventive concept may be composed of a body 10, a hinge 11, a light radiation device 12, and a power button 13.

The body 10 may be in the form of a half ring.

In detail, the body 10 may include a left body 10(1) which is connected with one end of the hinge 11 to be in contact with a user's (male's) penis (not shown) and face a left scrotum (not shown) and a right body 10(2) which is connected with the other end of the hinge 11 to be in contact with the user's penis (not shown) and face a right scrotum (not shown).

The body 10 may be formed of various materials, such as a plastic material or an elastic material, and may have various forms other than the above-mentioned half-ring form.

The hinge 11 may be provided in the body 10.

In detail, the hinge 11 may be provided in a middle point of the body 10. One end of the hinge 11 may be connected with the left body 10(1), and the other end of the hinge 11 may be connected with the right body 10(2).

In other words, one ends of the left and right bodies 10(1) and 10(2) may have a through hole (not shown) to keep the hinge 11. One half of the hinge 11 may be kept in the left body 10(1) through the through hole, and the other half of the hinge 11 may be kept in the right body 10(2) through the through hole.

The hinge 11 may be adjusted in angle to position the penis and the scrotum at an inner side of the body 10. The hinge 11 may be composed of an elastic material or the like.

In detail, when external forces are applied to the left and right bodies 10(1) and 10(2) in opposite directions, an angle between the left and right bodies 10(1) and 10(2) may increase.

When the external forces are applied to the left and right bodies 10(1) and 10(2) in the same directions, the angle between the left and right bodies 10(1) and 10(2) may decrease.

As described above, when the external forces are applied to the left and right bodies 10(1) and 10(2) in different directions, the angle between the left and right bodies 10(1) and 10(2) may be increased by the hinge 11 and a user (not shown) may position the penis and the scrotum at the inner side of the body 10.

Furthermore, when the external forces are applied to the left and right bodies 10(1) and 10(2) in the same directions in the state where the penis and the scrotum are positioned at the inner side of the body 10, the angle between the left and right bodies 10(1) and 10(2) may be decreased by the hinge 11 and the penis and the scrotum may be fixed to the inner side of the body 10.

Meanwhile, the wearable device 1 for male genitalia may be positioned in the direction of the center of the human body with respect to a virtual normal vector which has a center of gravity perpendicular to the ground parallel to an XY plane and passes through one point of an upper surface of the penis which is in contact with the wearable device 1 for male genitalia.

Because the center of gravity of the wearable device 1 for male genitalia is positioned in the direction of the center of the human body, the wearable device 1 for male genitalia may be fixed without being detached from the penis and the scrotum.

At this time, the body 10 may be in contact with the penis while having a predetermined angle (a degrees) with respect to the XY plane such that the center of gravity of the wearable device 1 for male genitalia is positioned in the direction of the center of the human body with respect to the virtual normal vector.

For example, the body 10 may be in contact with the penis while having any predetermined angle (a degrees) between from 70 degrees to 120 degrees with respect to the XY plane, but the inventive concept is not limited thereto.

The body 10 may be in contact with the penis while having the predetermined angle (a degrees) corresponding to various angles such that the center of gravity of the wearable device 1 for male genitalia is positioned in the direction of the center of the human body.

In other words, as the center of gravity of the wearable device 1 for male genitalia is positioned in the direction of the center of the human body, the body 10 may be in contact with the penis while having any predetermined angle (a degrees) which is not detached from the scrotum and the penis.

Meanwhile, because the user is able to use the wearable device 1 for male genitalia in the state where he or she wears the wearable device 1 for male genitalia on the penis and the scrotum in his or her underwear (pants), it may be prevented from being detached from the penis and the scrotum.

The light radiation device 12 may be provided in the body 10 to radiate a predetermined light in the direction of the penis and the scrotum.

Referring to FIGS. 1 and 2 together, the light radiation device 12 may be positioned at an upper side facing the penis and the scrotum in the left and right bodies 10(1) and 10(2).

Furthermore, the light radiation device 12 may include point light sources LS for radiating light having a predetermined wavelength band towards the penis and the scrotum during a predetermined duration.

Figure 2A:
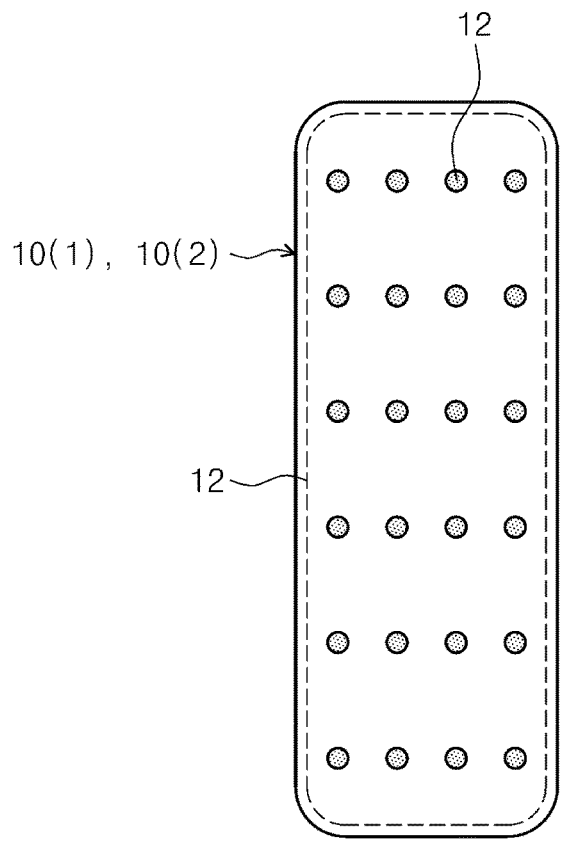
FIG. 2 is a cross-sectional view of a wearable device for male genitalia in FIG. 1 according to an embodiment of the inventive concept.
Figure 2B:
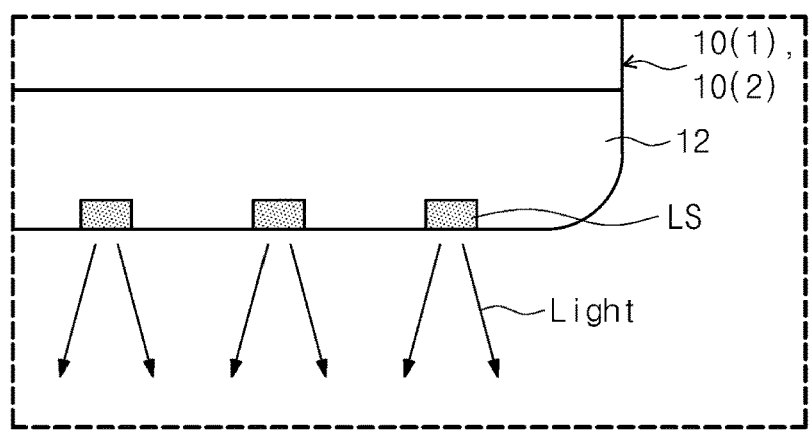

Referring to FIGS. 2A and 2B together, the plurality of point light sources LS may be arranged spaced apart from each other at a certain interval.

Meanwhile, although not illustrated in FIGS. 2A and 2B, a transparent plate (not shown) may be further included in an inner surface of the body 10 facing the penis and the scrotum. In other words, the light radiated from the plurality of point light sources LS may be radiated in the direction of the penis and the scrotum through the transparent plate (not shown).

The predetermined wavelength band of the light radiated from the light radiation device 12 may include an infrared band from the entire visible light band to 900 nm.

For example, the predetermined wavelength band of the light radiated from the light radiation device 12 may correspond to between from 630 nm to 880 nm, but the inventive concept is not limited thereto. The predetermined wavelength band of the light radiated from the light radiation device 12 may be set to various wavelength bands capable of improving a user's reproductive function to increase a user's testosterone level.

The duration when the light is radiated from the light radiation device 12 may be preset.

For example, the predetermined duration when the light is radiated from the light radiation device 12 may be 1 minute or 3 minutes, but the inventive concept is not limited thereto. The duration when the light is radiated from the light radiation device 12 may be variously set.

The power button 13 may be provided on an outer side of the body 10.

For example, the power button 13 may be provided on an outer side of the left body 10(1) or may be provided on an outer side of the right body 10(2).

When the power button 13 is pressed during a certain time by the user, the wearable device 1 for male genitalia may be turned on. Power supplied from the outside or previously charged power may be supplied to the light radiation device 12.

Meanwhile, when the power button 13 is pressed again during the certain time by the user who completes the use of the wearable device 1 for male genitalia, the wearable device 1 for male genitalia may be turned off and the user may end the use.

Alternatively, when the predetermined duration elapses, the radiation of the light from the light radiation device 12 may be stopped and the wearable device 1 for male genitalia may be automatically turned off.

Figure 3:
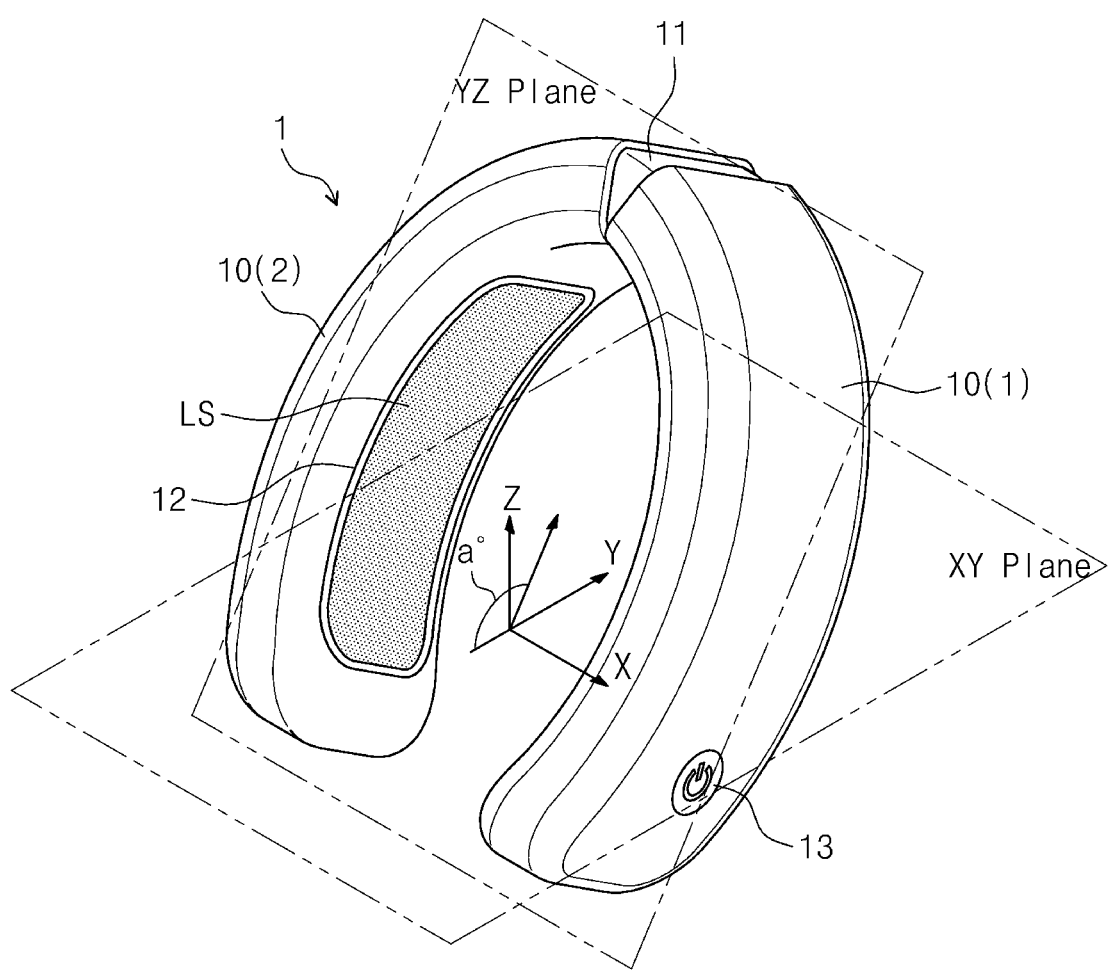
FIG. 3 is a perspective view of a wearable device for male genitalia according to an embodiment of the inventive concept.

FIG. 3 is a perspective view of a wearable device for male genitalia according to an embodiment of the inventive concept. FIG. 4 is a cross-sectional view of a wearable device for male genitalia in FIG. 3 according to an embodiment of the inventive concept.

Hereinafter, contents which are duplicated because of being substantially the same as or similar to the contents described above in FIGS. 1 and 2 will be omitted.

Referring to FIGS. 3 and 4 together, a light radiation device 12 may be positioned at an upper side facing a penis and a scrotum in left and right bodies 10(1) and 10(2).

Furthermore, the light radiation device 12 may include a surface light source LS for radiating light having a predetermined wavelength band towards the penis and the scrotum during a predetermined duration.

Figure 4A:
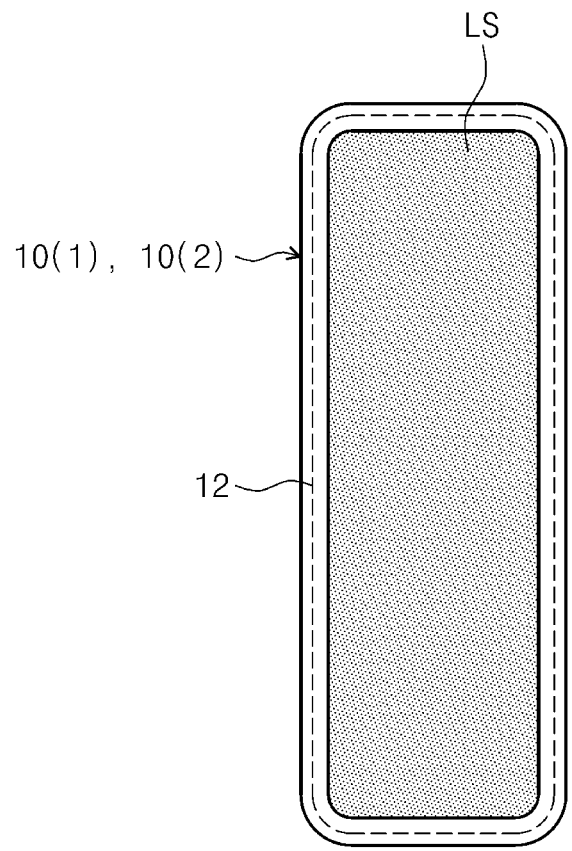
FIG. 4 is a cross-sectional view of a wearable device for male genitalia in FIG. 3 according to an embodiment of the inventive concept.
Figure 4B:
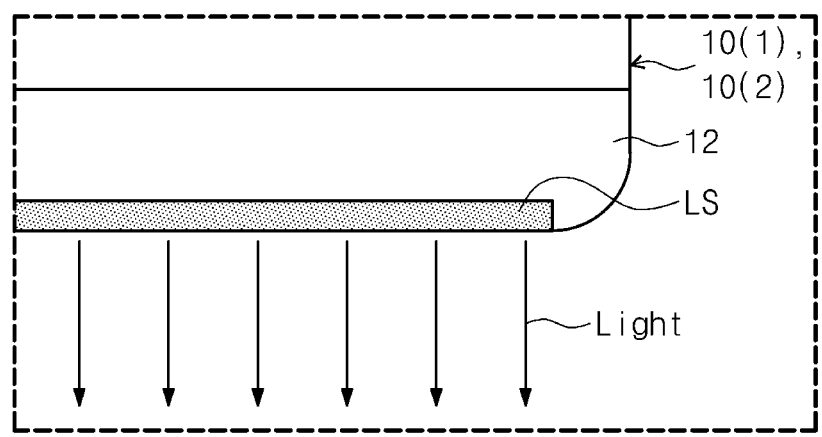

Referring to FIGS. 4A and 4B together, the surface light source LS positioned at the upper side facing the penis and the scrotum in the left and right bodies 10(1) and 10(2) may be composed of any one of an organic light emitting diodes (QLED) element, a quantum dot light emitting diode (QLED), and an electroluminescent (EL) element.

Unlike the wearable device 1 for male genitalia in FIGS. 1 and 2, the wearable device 1 for male genitalia in FIGS. 3 and 4 according to an embodiment of the inventive concept may include the surface light source LS in the light radiation device 12 and may radiate light to a wider area of the penis and the scrotum, thus improve a user's reproductive function and increasing a user's testosterone level.

Figure 5A:
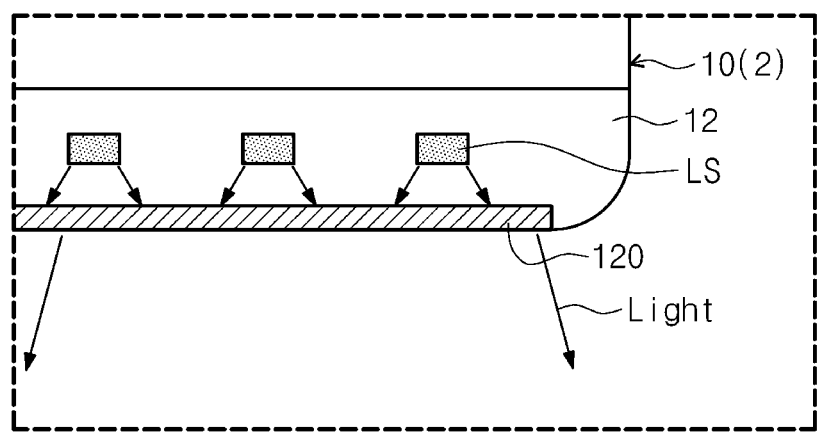
FIG. 5A is a cross-sectional view of a wearable device for male genitalia according to another embodiment of the inventive concept.

FIG. 5A is a cross-sectional view of a wearable device for male genitalia according to another embodiment of the inventive concept.

Referring to FIG. 5A, a wearable device 1 for male genitalia according to another embodiment of the inventive concept may further include a diffusion panel 120 on an upper surface of left and right bodies 10(1) and 10(2) facing a penis and a scrotum.

A plurality of point light sources LS included in a light radiation device 12 may radiate light in the direction of the penis and the scrotum. At this time, light is diffused by the diffusion panel 120.

At this time, the diffusion panel 120 may be composed of various materials, such as a diffusion plate or a diffusion layer for diffusing light.

In other words, the light radiation device 12 of the wearable device 1 for male genitalia in FIG. 5A according to another embodiment of the inventive concept may include the plurality of point light sources LS and may further include the diffusion panel 120 for diffusing the light radiated from the plurality of point light sources LS, thus irradiating light to a wider area of the penis and the scrotum compared to the wearable device 1 for male genitalia in FIGS. 1 and 2.

In other words, the wearable device 1 for male genitalia in FIG. 5A may show the same effect as the surface light source LS of the wearable device 1 for male genitalia in FIGS. 3 and 4 using the diffusion panel 120.

Figure 5B:
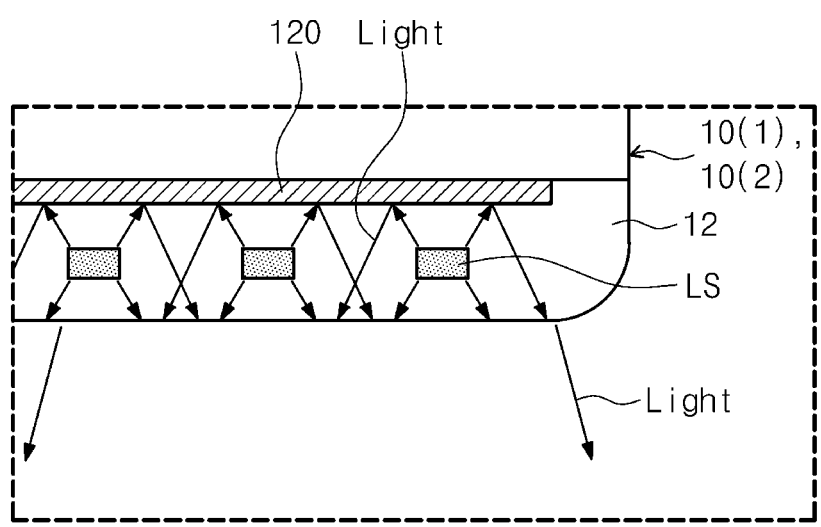
FIG. 5B is a cross-sectional view of a wearable device for male genitalia according to another embodiment of the inventive concept.

FIG. 5B is a cross-sectional view of a wearable device for male genitalia according to another embodiment of the inventive concept.

Referring to FIG. 5B, a wearable device 1 for male genitalia according to another embodiment of the inventive concept may include a reflector panel 121 in left and right bodies 10(1) and 10(2).

A plurality of point light sources LS included in a light radiation device 12 may radiate light in a radial manner in the light radiation device 12. At this time, light radiated in a direction opposite to a penis and a scrotum may be reflected by the reflector panel 121.

At this time, the reflector panel 121 may be composed of various materials such as a reflector or a reflective layer for reflecting light.

In other words, the light radiation device 12 of the wearable device 1 for male genitalia in FIG. 5B according to another embodiment of the inventive concept may further include the reflector panel 121 for reflecting the light radiated in the radial manner from the plurality of point light sources LS to be towards the direction of the penis and the scrotum, thus radiating more light to the penis and the scrotum than the wearable device 1 for male genitalia for FIGS. 1 and 2.

In other words, the wearable device 1 for male genitalia in FIG. 5B may less reduce lost light and more radiate light to the penis and the scrotum intensively than the wearable device 1 for male genitalia in FIGS. 1 and 2 using the reflector panel 121.

Figure 5C:
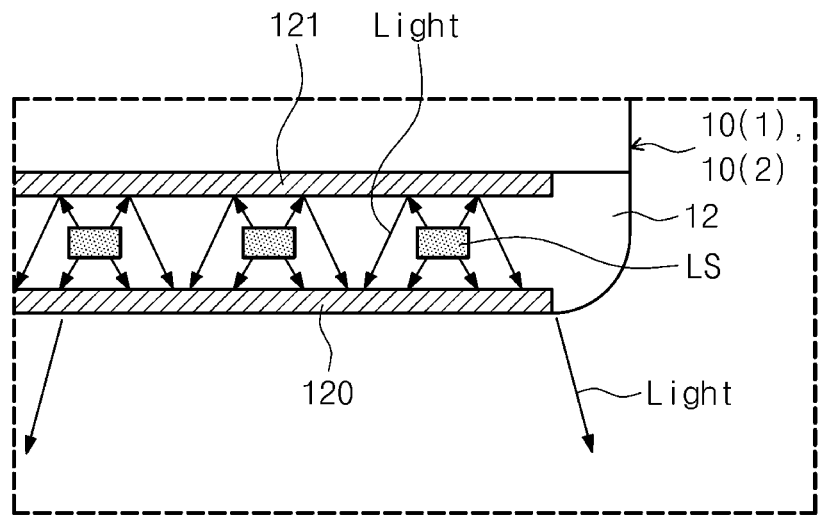
FIG. 5C is a cross-sectional view of a wearable device for male genitalia according to another embodiment of the inventive concept.

FIG. 5C is a cross-sectional view of a wearable device for male genitalia according to another embodiment of the inventive concept.

Referring to FIG. 5C, a wearable device 1 for male genitalia according to another embodiment of the inventive concept may further include a diffusion panel 120 on an upper surface of left and right bodies 10(1) and 10(2) facing a penis and a scrotum.

Furthermore, referring to FIG. 5C, the wearable device 1 for male genitalia according to another embodiment of the inventive concept may further include a reflector panel 121 in the left and right bodies 10(1) and 10(2).

At this time, the diffusion panel 120 may be composed of various materials, such as a diffusion plate or a diffusion layer for diffusing light. The reflector panel 121 may be composed of various materials, such as a reflector or a reflective layer for reflecting light.

A plurality of point light sources LS included in a light radiation device 12 may radiate light in a radial manner in the light radiation device 12. At this time, light radiated in a direction opposite to the penis and the scrotum may be reflected by the reflector panel 121.

Furthermore, the light radiated in the direction of the penis and the scrotum by the point light sources LS in the light radiation device 12 and the light reflected by the reflector panel 121 may be diffused by the diffusion panel 120.

In other words, the wearable device 1 for male genitalia in FIG. 5C according to an embodiment of the inventive concept may further include the reflector panel 121 for reflecting the light in the radial manner from the plurality of point light sources LS to be towards the direction of the penis and the scrotum to less reduce lost light than the wearable device 1 for male genitalia in FIGS. 1 and 2 and may radiate light to a wider area of the penis and the scrotum than the wearable device 1 for male genitalia in FIGS. 5A and 5B using the diffusion panel 120 for diffusing the light directly radiated in the direction of the penis and the scrotum from the point light sources LS and the light reflected by the reflector panel 121 and radiated in the direction of the penis and the scrotum, thus improving a user's reproductive function and increasing a user's testosterone level.

Figure 5D:
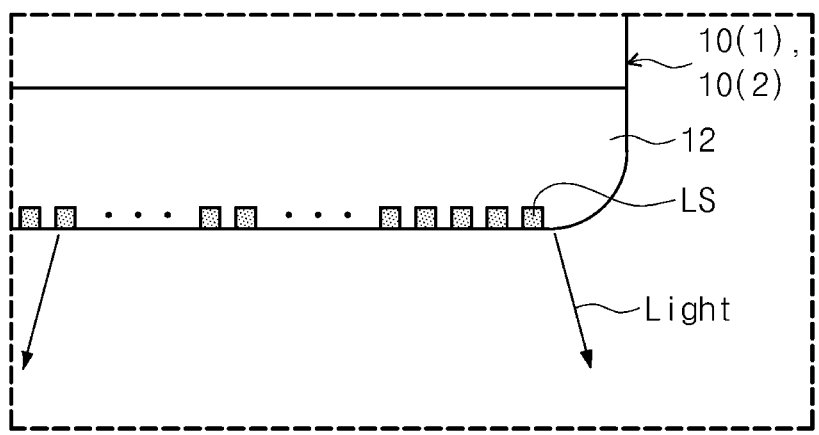
FIG. 5D is a cross-sectional view of a wearable device for male genitalia according to another embodiment of the inventive concept.

FIG. 5D is a cross-sectional view of a wearable device for male genitalia according to another embodiment of the inventive concept.

Referring to FIG. 5D, a light radiation device 12 may be positioned at an upper side facing a penis and a scrotum in left and right bodies 10(1) and 10(2).

Furthermore, the light radiation device 12 may include a plurality of micro LED elements LS for radiating light having a predetermined wavelength band towards the penis and the scrotum during a predetermined duration.

Referring to FIG. 5D, the plurality of micro LED elements LS are arranged spaced apart from each other at a certain interval, but this is for convenience of description.

In other words, the plurality of micro LED elements LS may be very small in size and may be arranged at a very short interval to radiate light in the direction of the penis and the scrotum.

The light radiation device 12 of the wearable device 1 for male genitalia in FIG. 5D according to another embodiment of the inventive concept may include the plurality of micro LED elements LS, thus radiating light to a wider area of the penis and the scrotum than the wearable device 1 for male genitalia in FIGS. 1 and 2 and showing the same effect as the surface light source LS of the wearable device 1 for male genitalia in FIGS. 3 and 4.

While the inventive concept has been described in connection with what is presently considered to be practical embodiments, it is to be understood that the inventive concept is not limited to the disclosed embodiments, but, on the contrary, is intended to cover various modifications and equivalent arrangements included within the spirit and scope of the appended claims. Therefore, those skilled in the art will understand that various modifications and other equivalent embodiments are possible from it. Consequently, the true technical protective scope of the inventive concept must be determined based on the technical spirit of the appended claims.

The invention claimed is:

1. A wearable device for male genitalia, the wearable device comprising:
   a body being in the form of a half ring and including a left body and a right body;
   a hinge connected between the left body and the right body and configured to position a penis and a scrotum at an inner side of the body; and
   a light radiation device provided in the body and configured to radiate light having a predetermined wavelength band in the direction of the penis and the scrotum,
   wherein the hinge is an elastic plate,
   wherein an entire portion of a left half of the elastic plate is slidably inserted into a through hole of the left body and an entire portion of a right half of the elastic plate is slidably inserted into a through hole of the right body when no external force is applied to the left and right bodies,
   wherein a middle portion of the elastic plate is partly exposed through the through holes only when external forces are applied to the left and right bodies to adjust an angle between the left and right bodies,
   wherein the elastic plate is slidable with respect to both of the left body and the right body.

2. The wearable device of claim 1, wherein a left body is configured to be in contact with the penis and face a left scrotum by the external forces and a right body is configured to be in contact with the penis and face a right scrotum by the external forces.

3. The wearable device of claim 2, wherein the hinge is fitted into the inside of the body through the through holes to increase an angle between the left body and the right body when the external forces are applied to the left and the right bodies in opposite directions and is removed to the outside of the body to decrease the angle between the left body and the right body when the external forces are applied to the left and the right bodies in the same directions.

4. The wearable device of claim 3, wherein the penis and the scrotum are positioned at the inner side of the body when the angle between the left body and the right body increases by the external forces, and
wherein the penis and the scrotum are fixed to the inner side of the body when the angle between the left body and the right body decreases by the external forces in the state where the penis and the scrotum are positioned at the inner side of the body.

5. The wearable device of claim 2, wherein the light radiation device includes a plurality of point light sources positioned at an upper side facing the penis and the scrotum in the left and right bodies and configured to radiate the light having the predetermined wavelength band during a predetermined duration.

6. The wearable device of claim 2, wherein the light radiation device includes a surface light source positioned at an upper side facing the penis and the scrotum in the left and right bodies and configured to radiate the light having the predetermined wavelength band during a predetermined duration.

7. The wearable device of claim 6, wherein the surface light source is composed of any one of an organic light emitting diodes (OLED) element, a quantum dot light emitting diode (QLED) element, and an electroluminescence (EL) element.

8. The wearable device of claim 5, further comprising:
a diffusion panel disposed on an upper surface of the left and right bodies facing the penis and the scrotum and configured to diffuse the light radiated from the point light sources in the direction of the penis and the scrotum.

9. The wearable device of claim 5, wherein the left and right bodies include a reflector panel positioned in the left and right bodies and configured to reflect the light radiated from the point light sources in the direction of the penis and the scrotum.

10. The wearable device of claim 9, further comprising:
a diffusion panel disposed on an upper surface of the left body and the right body facing the penis and the scrotum and configured to diffuse the light reflected from the reflector panel in the direction of the penis and the scrotum.

11. The wearable device of claim 2, wherein the light radiation device includes a plurality of micro LED elements positioned at an upper side facing the penis and the scrotum in the left and right bodies and configured to radiate the light having the predetermined wavelength band during a predetermined duration.

* * * * *